June 25, 1963  E. M. VAN WAGNER ET AL  3,094,910
REFLEX XEROGRAPHIC APPARATUS
Filed July 5, 1960

*INVENTOR.*
EDWARD M. VAN WAGNER
CHRISTOPHER SNELLING
BY

*ATTORNEY*

United States Patent Office 3,094,910
Patented June 25, 1963

3,094,910
REFLEX XEROGRAPHIC APPARATUS
Edward M. Van Wagner, North Rochester, and Christopher Snelling, Brockport, N.Y., assignors to Xerox Corporation, a corporation of New York
Filed July 5, 1960, Ser. No. 40,772
7 Claims. (Cl. 95—1.7)

This invention relates in general to xerography and in particular to methods and apparatus for xerography including exposure of the type generally known as reflex exposure.

In the art of xerography it has generally been necessary to employ exposure through lenses or similar optical systems to reproduce copy of an original document or hard copy. There are numerous reasons for this, one being that the preferred xerographic photoconductor is characterized by being essentially opaque to actinic light and is further characterized by employing an opaque support material. Thus, it is necessary to provide a modified xerographic plate in order to accomplish exposure from the front surface of a document or other hard copy placed in face-to-face relationship with the xerographic photosensitive surface.

The commercial xerographic photoconductors, such as selenium, are characterized by excellent photosensitive properties for many purposes and by having a photographic speed adequate for projection exposure in most cases requiring exposures of a few seconds up to 20 or 30 seconds. Reflex exposure, however, would make possible exposure times of a fraction of a second with moderate light source, employing reflex exposure apparatus which is more compact in size and economical to build.

Accordingly, one object of the present invention is to provide reflex exposure apparatus and methods suitable for reflex xerography in conjunction with an xerographic plate, independent of its transparency or opacity to actinic light.

One characteristic of commercial xerographic plates is that with many methods of development or image visualization it has been found difficult to create accurate reproductions of continuous tone images or of certain images containing large dark areas. Another object of this invention, therefore, is to provide exposure methods and apparatus adapted to form patterned electrostatic latent images by means of simulated half-tone exposure, whereby continuous tone and large solid areas, and particularly photographic reversal images, can be effectively developed by virtually any development method.

Other objects of the invention will in part be obvious and will in part become apparent form the following specification and drawings in which.

Figure 1:
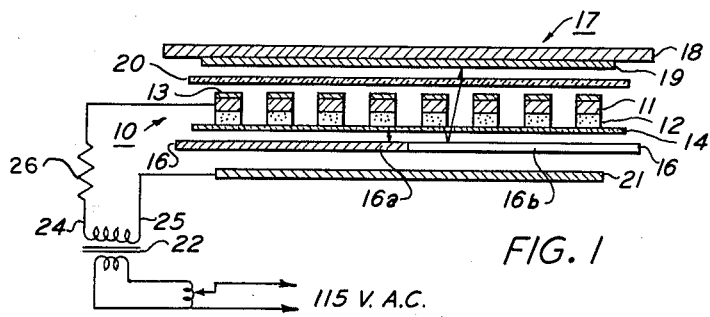
FIG. 1 is a diagrammatic representation of exposure apparatus according to one embodiment of the present invention.

This invention is particularly adapted for the copying or reproduction of hard copy, by which is meant documents, drawings, photographs and other pictures, printed or other information usually on paper or a paper substitute and capable of being physically handled or manipulated, particularly as distinguished from display information on a cathode ray tube, projected on a screen, or otherwise intended for visualization only. In accordance with the present invention a reproduction of hard copy may be made by placing it in face-to-face relationship with a xerographic plate and interposing between the hard copy and the plate an exposure device including an electro-luminescent layer optically shielded from the xerographic plate and so positioned as to be energized by an applied, fluctuating field and thereby adapted to emit actinic radiation toward the hard copy, which radiation in then reflected from the copy onto the surface of the xerographic photoconductor. In operation the shielded electroluminescent layer is sandwiched between conductive electrodes to which an energizing, fluctuating potential is applied, the electrodes being so disposed and adapted as to permit activating radiation to be transmitted from the hard copy to the photoconductor. In one embodiment, at least one of the conductive electrodes is transparent, permitting passage of activating radiation therethrough, and in another embodiment one electrode may be positioned behind the photoconductor and may, if desired, be the support electrode conventionally carrying the photoconductor of commercial xerographic plates. Thus, for example, in one embodiment of the invention a xerographic plate may comprise a photoconductor such as vitreous selenium supported on a backing electrode such as a sheet or drum of aluminum or similar matter and this backing electrode may in itself be one of the pair of energizing electrodes for the electroluminescent layer.

In a preferred embodiment of the invention the exposure device comprises a screened pattern of electroluminescent phosphor in a suitable binder, supported on a correspondingly screened opaque conductor. This device is adapted to be positioned near or against the face of the xerographic photosensitive layer, optically shielded therefrom by the screened opaque conductor, with hard copy positioned in face-to-face relationship with the electroluminescent layer.

*Example 1*

An exposure device was constructed comprising a pigment binder mixture of a commercial electroluminescent phosphor and an organic binder material, on a 65 mesh brass screen. The screen was prepared from a 2 mil sheet of brass by conventional photoresist procedures in which a coating of commercial photoresist metal was exposed to a 65 mesh screen pattern and conventionally processed and etched to produce a brass screen. The photoresist coating was allowed to remain on the screen and the opposite side was coated with an electroluminescent layer.

A commercial electroluminescent phosphor available under the name Du Pont #Q62–2861 ELP Blue was mixed with equal parts by weight of Krylon (a colorless plastic believed to be an acrylic resin, and available from Krylon, Inc.) as the binder, and the mixture thinned to spraying consistency with methyl ethyl ketone. The phosphor-binder mixture was sprayed onto the bare metal surface of the 65 mesh screen and a 1.5 mil sheet of cellulose nitrate was bonded over the electroluminescent layer by heat and pressure.

Employing the brass screen as one electrode and placing a conductive electrode over the electroluminescent layer, visible emission of light in the visible spectral range was obtained by connecting the screen and the adjacent electrode to the output of a Variac controlled transformer (115 volts to 160 volts) with a 1 megohm current limiting resistor in series.

A wide variety of commercially available electroluminescent phosphors may be employed in the exposure device as described, including for example:

Du Pont #Q62–2861 Blue
    Du Pont #Q96–3253 Yellow
    Du Pont #Q62–3316 Green
    Du Pont #Q62–2801 Green
    Du Pont #Q62–3252 Deep Blue
    USRC #786B Blue
    USRC #1036B Yellow
    Derby & Co. #EP–8A Blue The binder material in general comprises an electrically insulating film-forming binder including, for example, various polystyrene, polyethylene, polyester and acrylic type resins and the like. Suitable resins include but are not limited to polyethylene materials such as Dylan and Dylene (Koppers Co.), and Lustrex (Monsanto Chemical Co.); styrene-acrylonitrile materials such as Tyril (Dow Chemical Co.); polyesters such as Hetron (Hooker Electrochemical Co.); phenol-formaldehyde resins such as Durez (Hooker Chemical Co.); and acrylic resins such as Krylon.

The operation of the exposure device for generating and emitting illumination for xerographic image exposure is illustrated in FIG. 1 wherein is shown one embodiment of exposure apparatus according to the present invention. An exposure device generally designated 10 comprises at least an opaque, conductive patterned support member 11 having a layer of electroluminescent material 12 on one surface thereof. Construction of such a device is illustrated in Example 1. The device may include, if desired, a bonded resin layer 13 on the reverse side of the metal screen and may include if desired a sheet 14 of plastic or the like on the electroluminescent side of the screen. Such layers comprising a photoresist 13 and a sheet of cellulose nitrate 14 are disclosed in Example 1.

The exposure device 10 is positioned in sandwich configuration between hard copy 16, such as a typewritten document or the like containing light absorptive areas 16a and reflective areas 16b and a conventional xerographic plate 17 comprising, in general, a conductive support base 18 on which is positioned, in electrical contact therewith, a photoconductive insulating layer 18 such as a layer of photoconductive insulating vitreous selenium. The hard copy 16 is positioned on the electroluminescent side of the exposure device and the xerographic plate 17 is positioned on the screen side of the device. Desirably an insulating film 20 is positioned between the screen 11 and the photoconductor 19. A suitable film may be a 1.5 mil sheet of a cellulose acetate resin (available under the name Kodapak) or virtually any other suitable electrically insulating, transparent sheet material. The entire assembly was placed against a conductive electrode 21 such as a sheet of metal with the hard copy 16 positioned next to this electrode 21.

A suitable alternating current potential is applied between this electrode 21 and either screen 11 or the conductive support 17 of the xerographic plate. A suitable source of electric potential may be the output of a transformer 22 such as a Variac controlled transformer having an output voltage of about 650 volts A.C. In FIGURE 1 is illustrated connection of secondaries 24 and 25 of the output transformer 22 to the electrode 21 and the screen 11 through a one-megohm current limiting resistor 26.

As an illustration of the use and operation, a document containing printed information was employed as the hard copy 16 and was placed face up on electrode 21, positioned against the exposure device 10. A sheet of Kodapak was placed between the screen 11 and a commercial xerographic plate which was pre-charged and placed face down on the assembly. A very mild pressure was applied to assure light, uniform contact throughout the area of the exposure and a 650 volt A.C. potential was applied to the exposure assembly for an optimum exposure, found to be 8 seconds. During exposure, light from the exposure device 10 floods the hard copy 16 and was selectively reflected from the light areas 16b to the plate 17. The xerographic plate was removed and developed by conventional techniques to form a visible powder image which was transferred to a support sheet of paper and fixed thereon. The image may be developed on the surface of the insulating sheet 20 which can be removed together with the xerographic plate or may be developed on the surface of the xerographic plate itself after removal of sheet 20. If desired, the image may be developed and fixed directly on the transparent sheet 20 to provide a positive transparency for viewing, projection, or the like.

Figure 2:
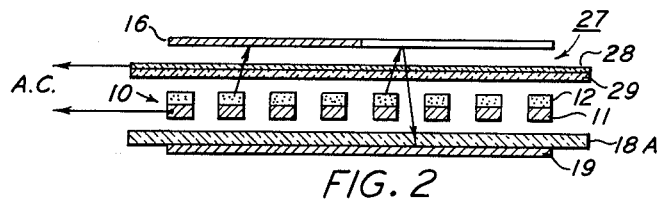
FIG. 2 is a diagrammatic representation of exposure apparatus according to a second embodiment of the invention.

In FIG. 2 is illustrated another embodiment of the invention in which mirror reversal is achieved. An exposure device generally designated 10 including a brass screen 11 and an electroluminescent phosphor layer 12 is positioned against the back surface of a xerographic plate comprising a layer of photoconductive insulating selenium 19 disposed on a transparent conductive support member 18a. This support member may be any suitable transparent conductor such as for example conductive glass available under the name Nesa. An electrode generally designated 27 is positioned on the opposite side of the exposure device and may comprise a suitable transparent conductor such as, for example, a sheet of glass, plastic or the like 29, at least one surface of which is conductive as for example by means of a thin transparent conductive layer 28. The brass screen 11 and the conductive layer 28 are adapted to be connected to an A.C. potential source, as for example the output of the Variac control transformer illustrated in FIG. 1.

In use and operation hard copy 16 is placed on the transparent conductive electrode 27 or is adapted to be fed to the surface thereof by a suitable automatic paper feed or the like. The copy is positioned against the electrode and an energizing potential is applied to the electrodes 27 and 11.

According to one embodiment of the invention illustrated in FIG. 2, the xerographic plate surface 19 may be charged or sensitized prior to application of the energizing potential to the electrode sandwiching the electroluminescent phosphor, whereupon an electrostatic image is formed by charge dissipation during exposure. Alternatively, the entire sandwich assembly can be moved progressively past a charging station while the energizing potential is applied to the phosphor, whereby charge is simultaneously deposited on and dissipated from the selenium surface. In either event an electrostatic image is formed on the photoconductive surface and is of the same reading direction as the image on the hard copy. A mirror-reversed image may be achieved by the developing and transferring to a record surface.

Figure 3:
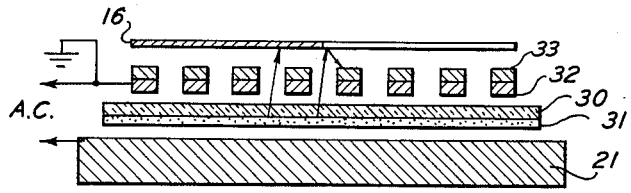
FIG. 3 is a diagrammatic representation of exposure apparatus according to a third embodiment of the invention.

In FIG. 3 is illustrated another embodiment of the invention. In this embodiment there is employed a modified exposure device comprising a layer 31 of electroluminescent phosphor in an organic binder deposited on a transparent support material 30 such as, for example, a 2 mil film of polyester (available under the name "Mylar"). The layer 31 may be sprayed on the surface according to the procedure of Example 1, or may be applied by other methods such as dipping, extrusion coating, or doctor blade application. A clean xerographic plate as hereinafter described is positioned against the exposure device with a screen conductive electrode 32 in contact with the exposure device and a layer 33 of photoconductive insulator disposed on the exposed surface of the screen. A sheet of hard copy 16 is adapted to be positioned against and facing the photoconductive layer.

The xerographic plate illustrated in FIG. 3 comprises a metal screen which may, for example, be a 65 mesh metal sheet etched into screen configuration according to the procedure of Example 1. A layer of photoconductive vitreous appearing selenium is deposited on the surface of the screen by a suitable method such as, for example, the methods disclosed in U.S. Patent 2,753,278.

Figure 4:
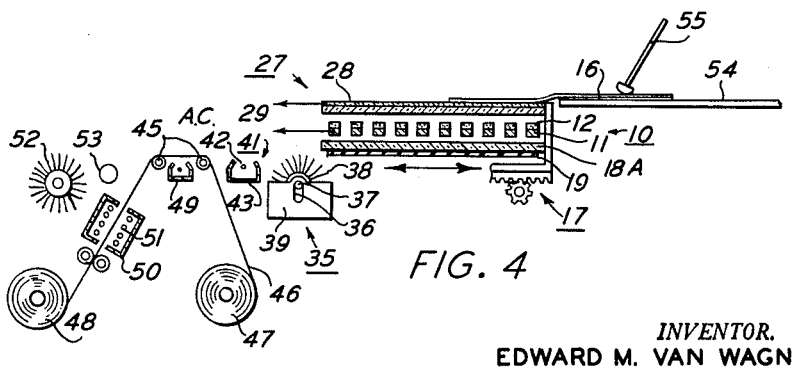
FIG. 4 represents a xerographic machine embodying exposure apparatus according to one form of the invention.

In FIG. 4 is illustrated diagrammatically semi-automatic apparatus adapted to produce copy from documents such as typed orders and the like. The exposure apparatus illustrated in FIG. 4 generally includes that of FIG. 2, having an exposure device 10 comprising an opaque patterned support member 11 with a layer of electroluminescent material 12 on one surface thereof and includes a xerographic plate comprising a photoconductive layer 19 disposed on a transparent conductive support member 18a positioned closely adjacent to the opaque conductor of the exposure device. Means to apply and energizing potential such as an A.C. potential of several hundred volts may be as illustrated for example in FIG. 1, including a transformer connectable to commercial electric wiring. Above the exposure device is a conductive exposure panel generally designated 27 comprising a transparent member 29 conductive on at least one surface thereof as, for example, by means of a conductive coating 28. The assembly comprising the exposure device 10, the xerographic plate 17 and the exposure panel 27 is mounted as a unit and adapted to be driven as an assembly through xerographic operating stations as described hereinafter. Alternatively, the exposure panel may be fixed in position in a light tight cabinet (not shown) and the xerographic plate movable for processing.

A suitable xerographic developing component or device 35 is mounted to be selectively brought to bear against the moving surface of the xerographic plate 17. Such mounting may be by means of a slotted channel 36 adapted to receive a pin 37 such as an axle for a rotatable development member 38. The development member 38 may be a suitable conventional means for presenting xerographic developing powder or toner to the plate surface and may, for example, include a rotatable magnet movable through a supply of developer in a trough 39 generally in accordance with magnetic development means as illustrated, for example, in Simmons et al., U.S. 2,791,949. Other means for presenting powder to the surface may be employed including, for example, development means illustrated in Carlson U.S. 2,297,691 and Carlson U.S. 2,358,709.

Suitably positioned along the path of motion of the xerographic plate 17 is a charging member such as a corona discharge electrode 41 which may include one or more corona discharge wires 42 mounted within a shield 43 and positioned and adapted to deposit corona generated ions on the xerographic plate surface. Suitable corona discharge electrodes are illustrated in U.S. 2,836,725 and U.S. 2,777,957.

Positioned further along the path of travel of the xerographic plate 17 is a transfer station comprising apparatus adapted to transfer the developed powder image from the xerographic plate to a suitable record member. The transfer apparatus may include devices for rolling an adhesive record member against the plate surface as disclosed in Mayo et al. U.S. 2,261,289. A preferred transfer apparatus includes electrostatic transfer means such as disclosed in Schaffert 2,756,047 and may be for example, guide rolls 45 adapted to carry a record member 46 such as a web of paper from a supply roll 47 to a take-up roll 48 and having a corona discharge electrode 49 positioned and adapted to deposit corona generated ions on the exposed surface of the record member at a point of contact with the xerographic plate. Desirably, fusing apparatus for making the image permanent on the record member is positioned along the path of travel of such record member and may include a heating oven 50 having heating units 51 operable to melt a thermoplastic powder.

Suitable regeneration apparatus may also, if desired, be positioned along the path of motion of the plate, including for example a cleaning brush 52 and a pre-cleaning charging device 53 such as, for example, a corona discharge electrode as illustrated in Walkup U.S. 2,832,977.

Various drive means may be employed including manual operation or a mechanized rack and pinion drive 56 to propel the assembly through the operational locations for development, transfer and cleaning, thence in a reverse direction for recharging by means of electrode 41 and back to the starting position. In the operation cycle, the development apparatus 35 is movable into and out of contact with the xerographic plate surface as is the transfer apparatus 49, particularly if pressure transfer embodiments are employed. The charging apparatus 41 is not movable if corona charging embodiments are employed, but in such case the corona electrode 41 preferably is capable of being deenergized during the development and transfer cycle. Alternatively, the charging electrode 41 is continuously energized in which event the transfer electrode 49 is energized to opposite electric polarity.

For automatic document feed, a document support 54 is positioned adjacent to the normal position of the exposure panel and a paper feed member 55 is operable to move documents from the support 50 to the surface of the exposure panel 27. The document may be removed manually or, if desired, automatic means may be employed for document removal as well as for document feed. Similarly automatic or manual drive mechanisms may be employed for the various moving parts or, if desired, manual drive may be used.

What is claimed is:

1. Xerographic exposure apparatus comprising means to support a photoconductive insulating layer in an exposure position, an electroluminescent layer adapted to be positioned and located adjacent to said photoconductive layer, means shielding said photoconductive layer from direct optical exposure to said electroluminescent layer, support means adapted to position hard copy in a face-to-face relationship with said electroluminescent layer and facing said photoconductive layer, and means presenting said photoconductor to direct optical exposure to the face of said hard copy, a first conductive electrode and a second conductive electrode adapted to be positioned adjacent said electroluminescent layer and means to position the electroluminescent layer therebetween, said electrodes being disposed to permit radiation from the hard copy to impinge on the photoconductive layer, and means to apply an energizing electric potential between said first and second electrodes to excite said electroluminescent layer to emission of activating radiation.

2. The apparatus of claim 1, wherein the photoconductive insulating layer is positioned overlying the first conductive electrode.

3. Xerographic exposure apparatus according to claim 1 in which said means shielding said photoconductive layer is a metal screen supporting said electroluminescent layer.

4. Xerographic exposure apparatus according to claim 3 in which said electroluminescent layer is an electroluminescent phosphor mixed with a colorless plastic resin binder.

5. Xerographic exposure apparatus according to claim 1 in which said means shielding said photoconductive layer and said first conductive electrode are the same structural member and comprise a conductive screen.

6. Xerographic exposure apparatus according to claim 5 in which said means to support a photoconductive insulating layer is a transparent conductive member and said transparent conductive member is positioned immediately adjacent to said means shielding said photoconductive layer.

7. Xerographic exposure apparatus comprising conductive screen means supporting a screen pattern photoconductive insulating layer in an exposure position, an electroluminescent layer located adjacent to said photoconductive layer on the side of said conductive screen, shielding means comprising said conductive screen for shielding said photoconductive layer from direct optical exposure to said electroluminescent layer, support means adapted to position hard copy in face-to-face relationship with both said electroluminescent and said photoconductive layer and disposed so that said photoconductive layer is intermediate of said hard copy and said electroluminescent layer, means presenting said photoconductive layer for direct optical exposure to the face of said hard copy, a first conductive electrode comprising said conductive screen as a structural member, a second conductive electrode, means to position said electroluminescent layer between said first electrode and said second electrode, and means to apply an energizing electric potential between said first and second electrodes to excite said electroluminescent layer to emission of acticating radiation for illumination of said hard copy.

References Cited in the file of this patent

UNITED STATES PATENTS

| | | |
|---|---|---|
| 2,809,294 | Vyverberg | Oct. 8, 1957 |
| 2,883,543 | Wohl | Apr. 21, 1959 |